US007540520B2

(12) United States Patent

Barlow et al.

(10) Patent No.: US 7,540,520 B2

(45) Date of Patent: *Jun. 2, 2009

(54) EXTENDABLE AND RETRACTABLE LEG REST

(75) Inventors: Richard T. Barlow, Clarks Summit, PA (US); John C. Carminati, Harvey's Lake, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/039,146

(22) Filed: Feb. 28, 2008

(65) Prior Publication Data

US 2008/0143165 A1 Jun. 19, 2008

Related U.S. Application Data

(62) Division of application No. 10/960,864, filed on Oct. 7, 2004, now Pat. No. 7,360,840.

(60) Provisional application No. 60/509,501, filed on Oct. 8, 2003.

(51) Int. Cl.
*B62M 1/14* (2006.01)

(52) U.S. Cl. ............................... 280/304.1; 297/423.26

(58) Field of Classification Search .............. 280/304.1; 297/423.26; 180/907

See application file for complete search history.

(56) References Cited

U.S. PATENT DOCUMENTS

| | | | | |
|---|---|---|---|---|
| 453,237 | A | 6/1891 | Goodwin | |
| 3,112,001 | A | 11/1963 | Wise | |
| 4,795,214 | A | 1/1989 | Holdt | |
| 4,949,408 | A | 8/1990 | Trkla | |
| 5,033,793 | A | 7/1991 | Quintile | |
| 5,259,664 | A | 11/1993 | Cottle | |
| 5,352,020 | A | 10/1994 | Wade et al. | |
| 5,507,562 | A | 4/1996 | Wieland | |
| 5,556,157 | A | 9/1996 | Wempe | |
| 5,673,967 | A | 10/1997 | Wempe | |
| 5,779,316 | A | 7/1998 | Sugawa et al. | |
| 6,086,157 | A | 7/2000 | Toso | |
| 6,168,238 | B1 | 1/2001 | Hannagan | |
| 6,425,635 | B1 | 7/2002 | Pulver | |
| 6,450,581 | B1 | 9/2002 | Koerlin | |
| 6,543,854 | B1 | 4/2003 | Finch | |
| 6,585,279 | B1 | 7/2003 | Galloway et al. | |
| 7,360,841 | B2 * | 4/2008 | Barlow et al. .......... | 297/423.36 |

FOREIGN PATENT DOCUMENTS

| | | | |
|---|---|---|---|
| DE | 42 33 811 | A1 | 4/1994 |
| GB | 2 330 299 | A | 4/1999 |

* cited by examiner

*Primary Examiner*—Tony H. Winner
(74) *Attorney, Agent, or Firm*—DLA Piper LLP (US)

(57) ABSTRACT

An extendable and retractable leg rest includes a first member which is mounted for rotation to a support. A second member supporting a footrest is coupled to the first member and slides relative to the first member as the first and second members rotate, extending away from the first member as the first and second members are rotated into a raised position and retracting toward the first member as the first and second members are rotated into a lowered position. Movement of the second member relative to the first member is driven by a third member coupled to the second member by a gear system.

11 Claims, 6 Drawing Sheets

EXTENDABLE AND RETRACTABLE LEG REST

CROSS REFERENCE TO RELATED APPLICATIONS

This application claims benefit of the filing date of U.S. Provisional Patent Application 60/509,501, "Reclining Seat with Shear Adjustment" filed Oct. 8, 2003, the subject matter of which is incorporated herein by reference, and is a divisional application of U.S. Utility application Ser. No. 10/960,864, filed Oct. 7, 2004.

FIELD OF THE INVENTION

The invention relates to chairs generally, and wheelchairs in particular, having one or more leg rests which are rotatable relative to a remainder of the chair and which also extend and retract during rotation.

BACKGROUND OF THE INVENTION

It is known to provide chairs, and wheelchairs in particular, having leg rests which are rotatable relative to a remainder of the chair, and which also extend and retract during rotation. For example, U.S. Pat. No. 5,259,664 (Cottle) discloses an extendable and retractable leg rest for a wheelchair having a rack and pinion assembly for extending and retracting the leg rest. A need exists for a powered extendible and retractable leg rest having a novel, simple, and robust mechanism to extend and retract the leg rest in accordance with rotation of the leg rest. A mechanism providing flexibility in the degree of extension and retraction achieved during rotation is thought to be particularly desirable.

SUMMARY OF THE INVENTION

In a first aspect, the invention is an extendable and retractable leg rest comprising a support member and a first elongated member rotatably coupled to the support member. A second elongated member is coupled to the first member for telescopic movement relative to the first member. The second elongated member includes a first rack gear and a footrest. An actuator is coupled to the support member and to the first member to rotate the first and second members relative to the support member. A third elongated member is rotatably coupled to the support member and includes a second rack gear. A gear component comprises at least one gear and is supported by the first elongated member and operatively engages the first and second rack gears. A biasing member couples the third elongated member to the first member to allow relative linear motion between the first and third members, and biases the third elongated member into operative engagement with the gear component. As the actuator rotates the first, second, and third members, movement of the third member relative to the first member causes the second member to translate relative to the first member. Preferably, the footrest is translated away from the first member as the first and second members are moved between a lowered position and a raised position and is translated toward the first member as the first and second members are moved between the raised position and the lowered position.

The extendable and retractable leg rest may be combined with a wheelchair having a frame. Preferably, the support member includes a pin sized and shaped to be received within a receptacle within the wheelchair frame. The pin may be rotatably received within the wheelchair frame receptacle.

Also preferably, the gear component comprises a first spur gear operatively engaged with the first rack gear and a second spur gear operatively engaged with the second rack gear, the first and second spur gears being fixedly coupled together for rotation about a common axis. The first spur gear has a first diameter and the second spur gear has a second diameter smaller than the first diameter, such that linear movement of the second rack by a first amount results in linear movement of the first rack by a second amount larger than the first amount.

In a second aspect, the invention is an extendable and retractable leg rest comprising a support frame and a housing having a first end pivotally connected to the support frame. An actuator is coupled to the support frame and to the housing to rotate the housing relative to the support frame. At least a first link is pivotally coupled at a first end to the support frame and pivotally coupled at a second end to a drive rack gear having at least a first gear rack. At least a first footrest support member is slidingly coupled to the housing. The first footrest support member includes a rack gear. A footrest is coupled to the first footrest support member. At least a first gear component comprises at least a first gear and is operatively engaged with the drive rack gear first gear rack and the first footrest support member rack gear. As the actuator rotates the housing, the first link moves the drive gear rack relative to the first footrest support member, causing the first footrest support member and footrest to translate relative to the housing. Preferably, the footrest is translated away from the housing as the housing is moved between a lowered position and a raised position and is translated toward the housing as the housing is moved between the raised position and the lowered position.

In a third aspect, the invention is an extendable and retractable leg rest for use with a wheelchair. The leg rest comprises a support frame and a housing having a first end pivotally connected to the support frame. A linear actuator is coupled to the support frame and to the housing to rotate the housing relative to the support frame between a lowered position and a raised position. At least a first link is pivotally coupled at a first end to the support frame and pivotally coupled at a second end to a drive rack gear having first and second gear racks. First and second footrest support members are slidingly coupled to the housing, each footrest support member having a rack gear. A footrest is coupled to the first and second footrest support members. A first gear component comprises a first gear operatively engaged with the drive rack gear first gear rack and a second gear operatively engaged with the first footrest support member rack gear. A second gear component comprises a first gear operatively engaged with the drive rack gear second gear rack and a second gear operatively engaged with the second footrest support member rack gear. The first and second gears of both the first and second gear components are fixedly coupled together for rotation about a common axis. The first gears have a first diameter and the second gears have a second diameter larger than the first diameter, such that linear movement of the drive rack gear by a first amount results in linear movement of the first and second footrest support members by a second amount larger than the first amount. As the actuator rotates the housing, movement of the drive gear rack relative to the first and second footrest support members rotates the first and second gear components and causes the first and second footrest support members and footrest to translate away from the housing as the housing is moved between the lowered position and the raised position and to translate toward the housing as the housing is moved between the raised position and the lowered position.

BRIEF DESCRIPTION OF THE DRAWINGS

For the purpose of illustrating the invention, there is shown in the drawings forms of the invention which are presently preferred; it being understood, however, that this invention is not limited to the precise arrangements and instrumentalities shown. In the drawings.

DETAILED DESCRIPTION OF THE DRAWINGS

Figure 1:
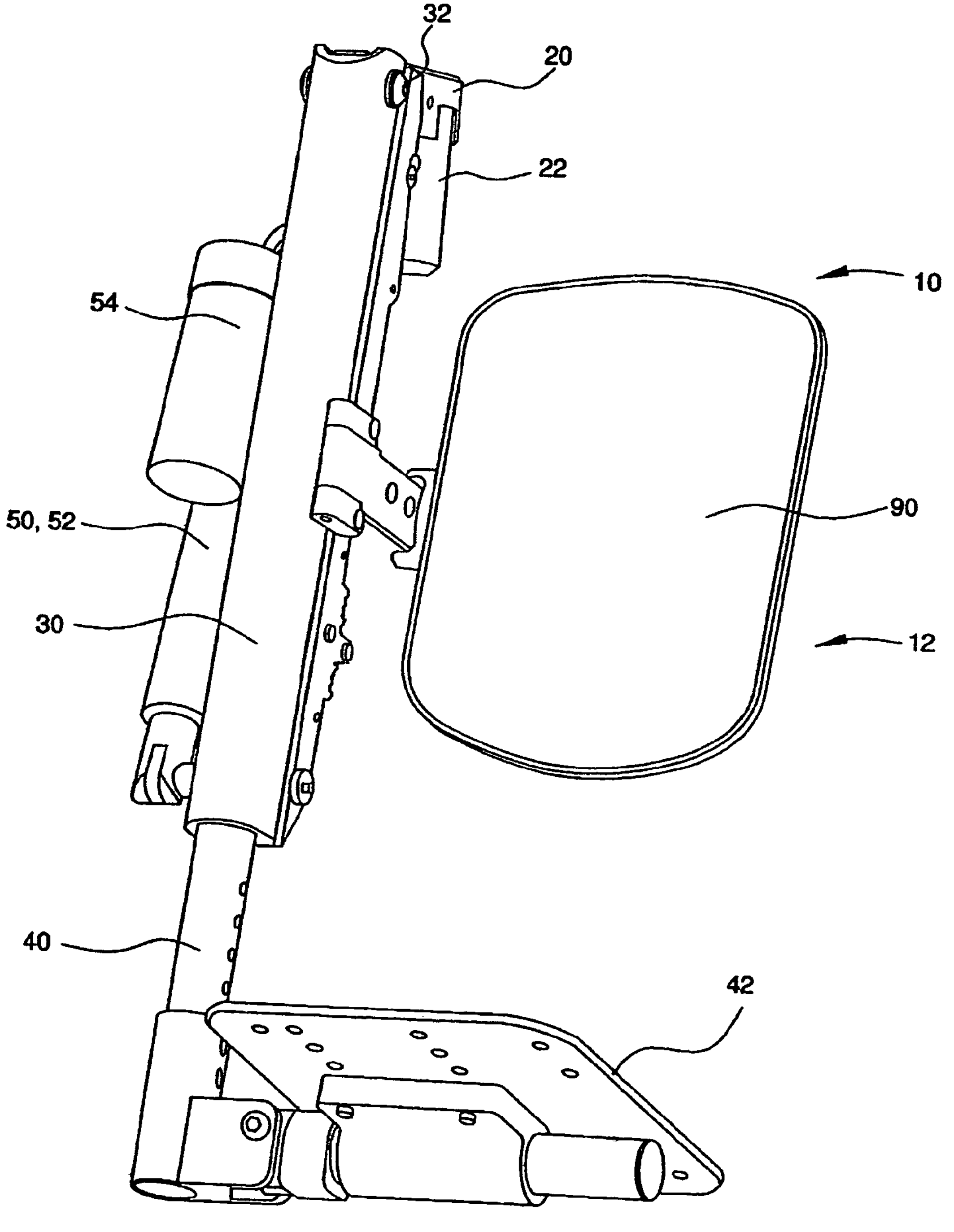
FIG. 1 is a front perspective view of a leg rest in accordance with a first preferred embodiment of the present invention, shown in a lowered and retracted position.
Figure 2:
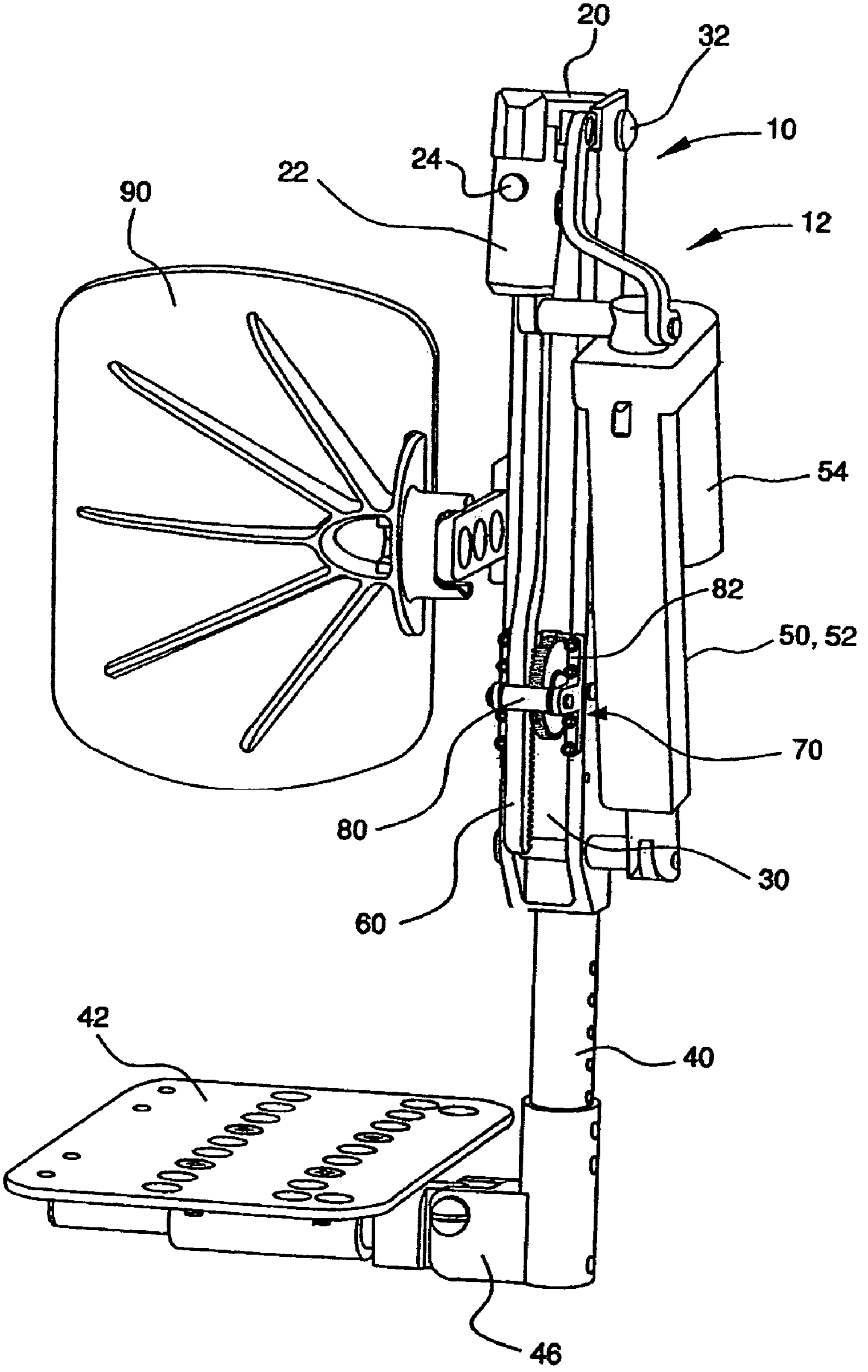
FIG. 2 is a rear perspective view of the leg rest of FIG. 1.
Figure 3:
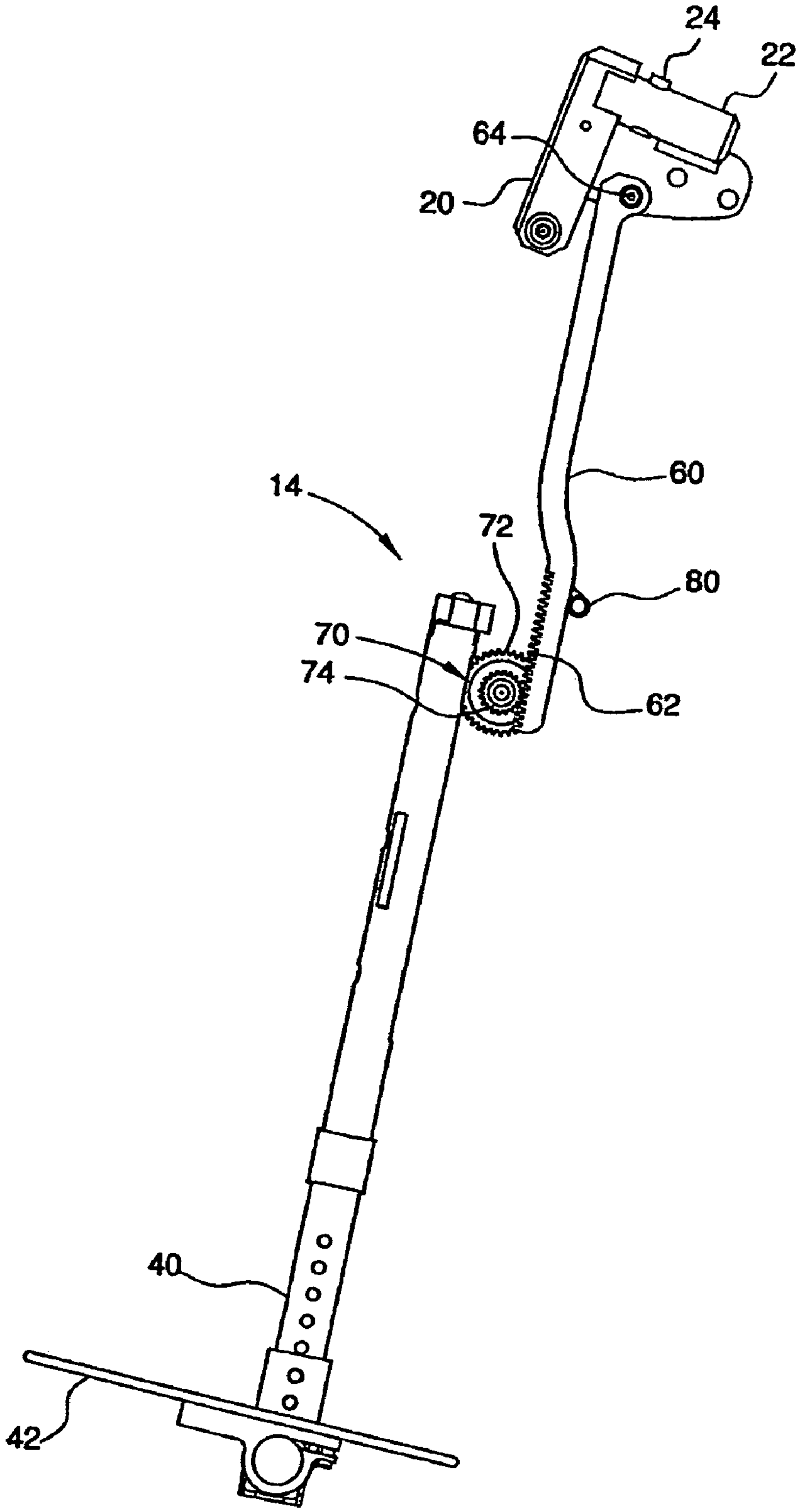
FIG. 3 is a side elevation view of components the leg rest of FIGS. 1 and 2, shown in a raised and extended position, and shown with various components removed to improve clarity.
Figure 4:
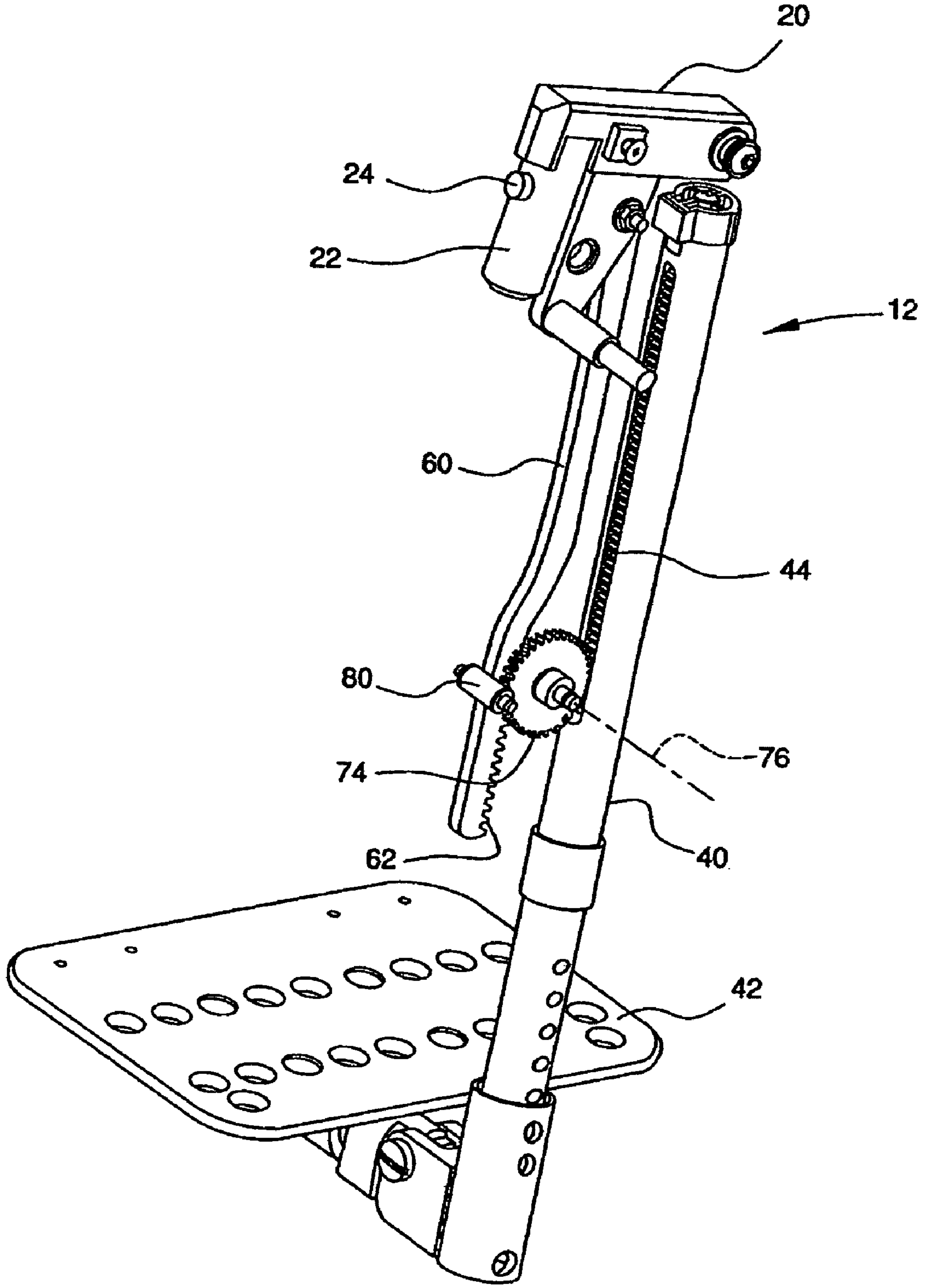
FIG. 4 is a rear perspective view of the leg rest components of FIG. 3, shown in the lowered and retracted position.

Referring to the drawings, wherein like numerals are used to indicate like elements throughout, there are shown in FIGS. 1-6 two presently preferred embodiments of a leg rest in accordance with the present invention. With particular reference to FIGS. 1-4, a first preferred embodiment leg rest is indicated generally by the reference numeral 10. The leg rest 10 preferably comprises a support member 20, a first elongated member 30, a second elongated member 40, a footrest 42, an actuator 50, a third elongated member 60, a gear component 70, a biasing member 80, and a leg or calf support 90. As described in detail below, the leg rest 10 moves between a lowered, retracted position 12 and a raised, extended position 14.

The support member 20 preferably includes a pin 22 sized and shaped to fit within a mating receptacle (not shown) of a wheelchair frame (not shown). Preferably, the pin 22 is rotatably received within the wheelchair frame receptacle (not shown), allowing the leg rest 10 to be swung toward a front end of the wheelchair (not shown), into an operative position, or swung away from the front end of the wheelchair (not shown), to provide additional clearance along the wheelchair front end (not shown). Preferably, the pin 22 includes a second pin 24 fixedly connected to the pin 22 to operate as a rotational stop. Further preferably, the pin 22 includes a latch (not illustrated), allowing the support member to be releasably locked into place relative to the wheelchair frame (not shown).

The first elongated member 30 is rotatably coupled to the support member 20 at a first pivot point 32. In the preferred embodiment shown, the first elongated member 30 is generally tubular in shape, and slidingly receives the second elongated member 40 for telescopic movement relative to the first member 30. It will be appreciated that the first elongated member 30 need not be tubular in shape, nor is it required that the second elongated member 40 be received within the first elongated member 30, as illustrated. As long as the second elongated member 40 is coupled to the first elongated member in a manner allowing sliding relative motion, other arrangements are possible.

The second elongated member 40 is shown in the first preferred embodiment to be generally tubular in shape, and to include a footrest 42 and a first rack gear 44. The first rack gear 44 may be formed integrally and unitarily with a remainder of the second elongated member 40, or may be formed separately, and subsequently connected to the second elongated member 40. The footrest 42 is preferably coupled to the second member 40 by a footrest mount 46.

The actuator 50 is coupled to the support member 20 and to the first member 30, and rotates the first and second members 30 and 40 relative to the support member 20 between the lowered, retracted position 12 and the raised, extended position 14. As discussed below, the actuator 50, in rotating the first and second members 30 and 40, provides the force necessary to extend and retract the second member 40 relative to the first member 30. The actuator 50 may be a linear actuator 52, as illustrated, or may be a rotary actuator (not illustrated). The actuator 50 is preferably operated by an electric drive 54. Operation of the actuator 50 is controlled by the user, using conventional control components and techniques well known in the art of electro-mechanical controls.

The third elongated member 60 is rotatably coupled to the support member 20 at a second pivot point 64. The third elongated member 60 includes a second rack gear 62. Similar to the first rack gear 44, the second rack gear 62 is preferably formed integrally and unitarily with a remainder of the third elongated member 60, but could be provided as a separate component attached to the third elongated member 60.

The gear component 70 comprises at least a first gear 72, and preferably a second gear 74. Gears 72 and 74 are preferably spur gears, but alternatively other types of gears such as helical gears could be substituted. The first and second gears 72, 74 are fixedly coupled together for rotation about a common axis 76. The gear component 70 is rotatably supported by the first elongated member 30. The gear component 70 operatively engages the first and second rack gears, 44 and 62. Preferably, the first gear 72 operatively engages the first rack gear 44 and the second gear 74 operatively engages the second rack gear 62. Further preferably, the first gear 72 has a first diameter and the second gear 74 has a second diameter smaller than the first diameter. Given the size differential between the first and second gears 72, 74, linear movement of the second rack 62 by a first amount results in linear movement of the first rack 44 by a second amount larger than the first amount.

The biasing member 80 couples the third elongated member 60 to the first member 30 while allowing relative linear motion between the first and third members 30, 60. The biasing member 80 is coupled to the first member 30, for example by a bracket support 82, as illustrated (see FIG. 2). The biasing member 80 biases the third elongated member 60 into operative engagement with the gear component 70.

The leg support 90 is preferably provided. In the embodiment illustrated, the leg support 90 is fixedly coupled to the first member 30. The leg support 90 preferably comprises a padded surface, incorporating a padding material, such as an elastomeric polymer gel.

Materials used in fabrication of the leg rest 10 components are conventional, for example polymeric materials or metals such as aluminum or steel. The leg rest 10 components are fabricated using conventional manufacturing techniques well known to those of ordinary skill in the art of wheelchair manufacturing.

In operation, as the actuator 50 rotates the first, second, and third members 30, 40 and 60, movement of the third member 60 relative to the first member 30 causes the second member 40 to translate relative to the first member 30. That is, because the first member 30 rotates about the first pivot point 32, and the third member 60 rotates about the second pivot point 64 which is non-coincident with the first pivot point 32, the first and third members 30, 60 move in a sliding motion relative to one another when simultaneously pivoted. That relative sliding motion turns the gear component 70, and moves the second member 40 via the first gear rack 44. More particularly, and preferably, the second member 40 and footrest 42 are translated away from the first member 30 as the first and second members 30, 40 are moved between the lowered, retracted position 12 and the raised, extended position 14 and is translated toward the first member 30 as the first and second members 30 and 40 are moved between the raised, extended position 14 and the lowered, retracted position 12.

Extension and retraction of the leg rest 10 is desirable as the length of a leg rest rotating between lowered and raised positions must change in order to maintain a footrest in a desirable position. A user's lower leg (not illustrated) in effect changes length relative to the leg rest as the leg rest is rotating. That is, because the user's knee rotates about an axis which is forward and above the axis about which the leg rest rotates (in the present case of the first embodiment leg rest 10, the axis of rotation corresponding to the first pivot point 32), to maintain the desired position of the footrest relative to the user's foot (not illustrated), the distance between the footrest and the leg rest axis of rotation must be increased as the leg rest rotates into a raised position, and must be decreased as the leg rest rotates into a lowered position.

Figure 5:
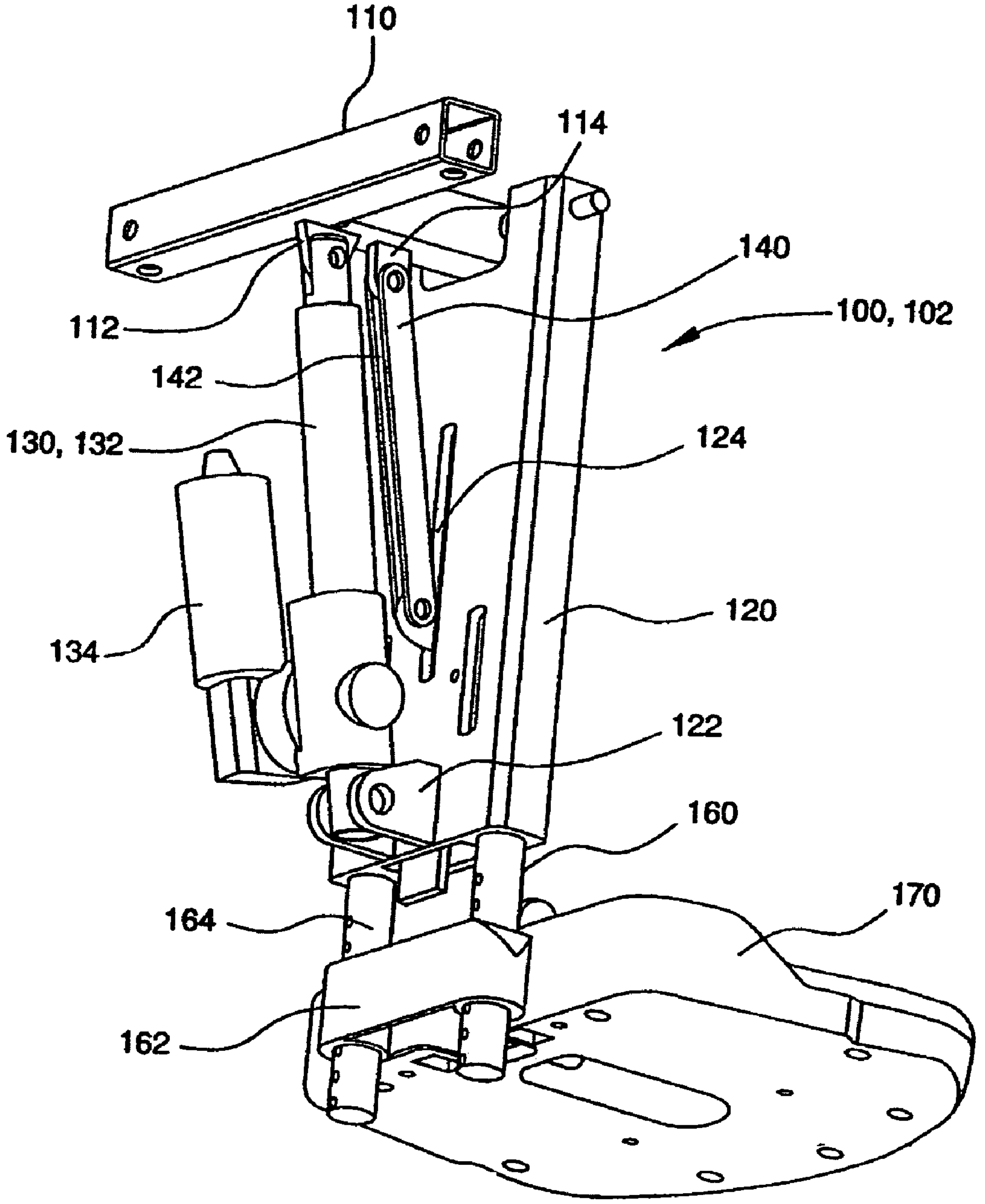
FIG. 5 is a rear perspective view of a leg rest in accordance with a second preferred embodiment of the present invention, shown in a lowered and retracted position.
Figure 6:
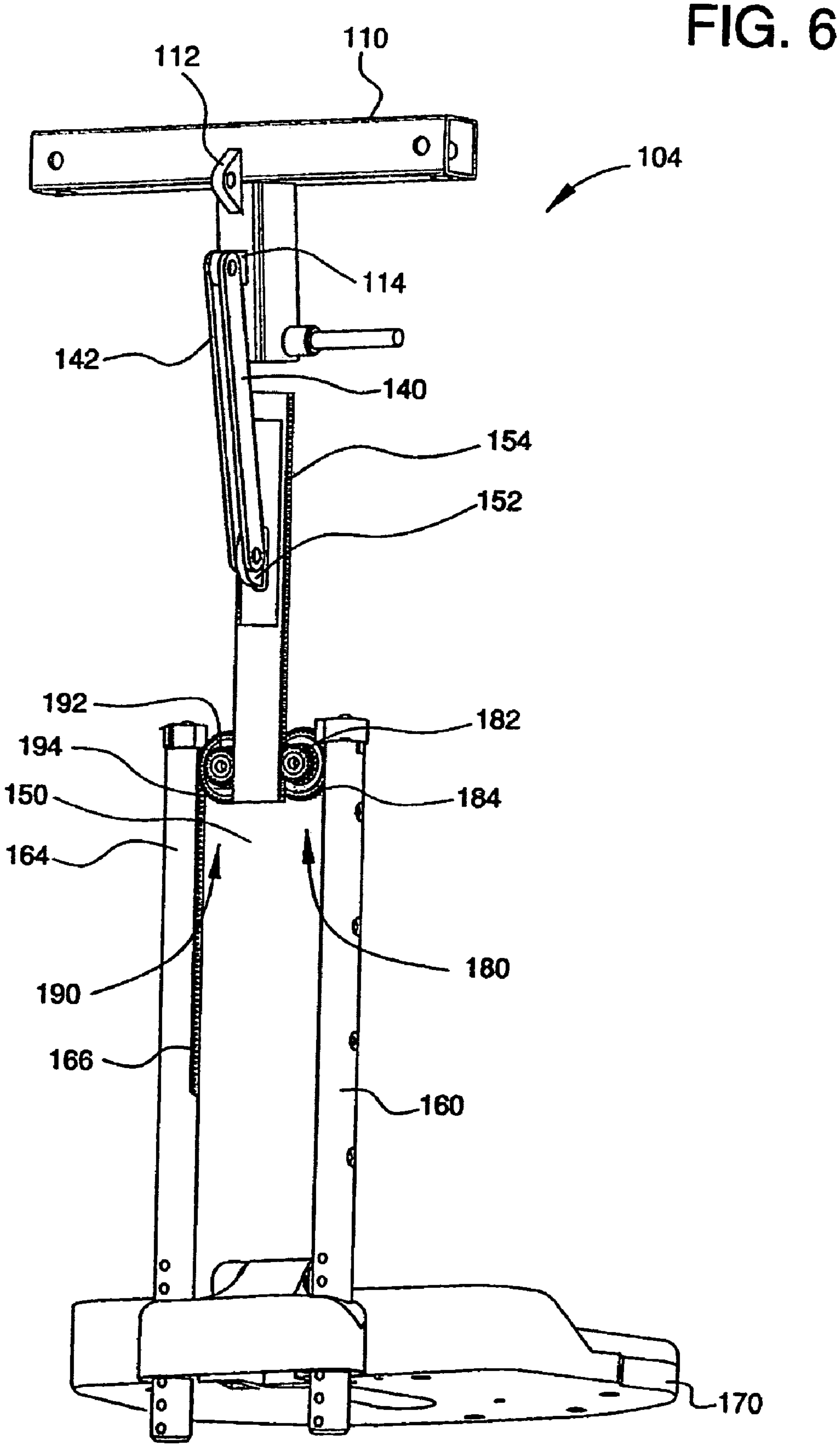
FIG. 6 is a bottom perspective view of the leg rest of FIG. 5, shown in a raised and extended position, and shown with various components removed to improve clarity.

With particular reference now to FIGS. 5 and 6, a second preferred embodiment leg rest 100 preferably comprises: a support frame 110; a housing 120; an actuator 130; first and second links 140 and 142; a drive rack gear 150; first and second footrest support members 160 and 164; a footrest 170; and first and second gear components 180 and 190. As described in detail below, the leg rest 100 moves between a lowered, retracted position 102 and a raised, extended position 104.

The support frame 110 is preferably conventional structural tubing coupled to or formed as a portion of a conventional wheelchair frame (not shown). A first mounting bracket 112 and a second mounting bracket 114 are fixedly connected to the support frame 110.

The housing 120 has a first end pivotally connected to the support frame 110 for rotation between the lowered position 102 and the raised position 104. The housing 120 includes a third mounting bracket 122 affixed at a second end of the housing 120. A cutout 124 is provided in the housing to allow movement of the links 140 and 142 and the drive rack gear 150 to move relative to the housing 120.

The actuator 130 is coupled to the support frame 110 and to the housing 120 to rotate the housing relative to the support frame 110 between the lowered position 102 and the raised position 104. The actuator 130 is preferably a linear actuator 132 preferably attached to the support frame 110 at first mounting bracket 112 and to the housing 120 at third mounting bracket 122. A rotary actuator (not illustrated) could also be used. The actuator 130 is preferably operated by an electrically-powered drive 134. Operation of the actuator 130 is controlled by the user, using conventional control components and techniques well known in the art of electro-mechanical controls.

At least a first link 140, and preferably first and second links 140, 142, are pivotally coupled at a first end to the support frame 120 at the second mounting bracket 114 and pivotally coupled at a second end to the drive rack gear 150 at a fourth mounting bracket 152. The drive rack gear 150 has at least a first gear rack 154, and is preferably provided with both the first gear rack 154 and a second gear rack (not clearly shown). Preferably, the drive rack gear 150 is a generally planar rectangular structure, and the first and second gear racks are preferably provided on opposing edges of the drive rack gear 150.

At least a first footrest support member 160 is slidingly coupled to the housing 120. Preferably, and as illustrated, first and second footrest support members 160, 164 are provided. The footrest support members 160, 164 are coupled to the footrest 170 by a footrest mount 162. The footrest 170 may be pivotably coupled to the footrest mount 162. Each footrest support member 160, 164 is provided with a rack gear. With reference to FIG. 6, a second footrest support member rack gear 166 is preferably formed integrally and unitarily with a remainder of the second footrest support member 164. Alternatively, the rack gear could be formed as a separate component, and attached to the footrest support member. The first footrest support member rack gear is not illustrated, but is similar to the second footrest support member rack gear 166.

At least a first gear component 180 comprises at least a first gear 182. Preferably, both the first gear component 180 and a second gear component 190 (having a first gear 192) are provided (see FIG. 6). Preferably, second gears 184 and 194 are provided for the first and second gear components 180, 190, respectively. Further preferably, the first gears 182 and 192 and second gears 184, 194 are spur gears, however, other types of gears could be substituted. The first and second gears of both the first and second gear components are fixedly coupled together for rotation about a common axis. The first gears 182, 192 have a first diameter and the second gears 184, 194 have a second diameter larger than the first diameter, such that linear movement of the drive rack gear 150 by a first amount results in linear movement of the first and second footrest support members 160, 164 by a second amount larger than the first amount.

The first gears 182, 192 are operatively engaged with the drive rack gear, gear racks and the second gears 184, 194 are operatively engaged with the first and second footrest support member rack gears, respectively. As the actuator 130 rotates the housing 120, movement of the drive gear rack 150 relative to the first and second footrest support members 160, 164 rotates the first and second gear components 180, 190 and causes the first and second footrest support members 160, 164 and footrest 170 to translate away from the housing 120 as the housing 120 is moved from the lowered position 102 into the raised position 104 and to translate toward the housing 120 as the housing 120 is moved from the raised position 104 into the lowered position 102.

As with the first embodiment leg rest 10, the second embodiment leg rest 100 is made from conventional materials, such as polymeric materials or metals such as aluminum or steel, and fabricated using conventional manufacturing techniques.

A powered extendable and retractable leg rest is thus disclosed, providing novel, simple, and robust mechanisms to extend and retract the leg rest in accordance with rotation of the leg rest. Furthermore, providing gear components having first and second spur gears of different diameters provides flexibility in the degree of extension and retraction achieved during rotation.

Although the invention has been described and illustrated with respect to the exemplary embodiments thereof, it should be understood by those skilled in the art that the foregoing and various other changes, omissions and additions may be made therein and thereto, without parting from the spirit and scope of the present invention. Accordingly, reference should be made to the appended claims, rather than to the foregoing specification, as indicating the scope of the invention.

What is claimed is:

1. An extendable and retractable leg rest comprising:

a support member;

a first elongated member rotatably coupled to the support member;

a second elongated member coupled to the first member for telescopic movement relative to the first member, the second elongated member including a first rack gear and a footrest;

an actuator coupled to the support member and to the first member to rotate the first and second members relative to the support member;

a third elongated member rotatably coupled to the support member and including a second rack gear;

a gear component comprising at least one spur gear and supported by the first elongated member and operatively engaging the first and second rack gears;

a biasing member coupling the third elongated member to the first member to allow relative linear motion between the first and third members, and biasing the third elongated member into operative engagement with the gear component, wherein as the actuator rotates the first, second, and third members, movement of the third member relative to the first member causes the second member to translate relative to the first member.

2. The extendable and retractable leg rest of claim 1, wherein the gear component comprising a first spur gear operatively engaged with the first rack gear and a second spur gear operatively engaged with the second rack gear, the first and second spur gears being fixedly coupled together for rotation about a common axis, wherein the first spur gear has a first diameter and the second spur gear has a second diameter smaller than the first diameter, such that linear movement of the second rack by a first amount results in linear movement of the first rack by a second amount larger than the first amount.

3. The extendable and retractable leg rest of claim 1, wherein the first and second members are rotatable between a lowered position and a raised position and the footrest is translated away from the first member as the first and second members are moved between the lowered position and the raised position and the footrest is translated toward the first member as the first and second members are moved between the raised position and the lowered position.

4. The extendable and retractable leg rest of claim 1 further comprising a leg support.

5. The extendable and retractable leg rest of claim 1, wherein the actuator is a linear actuator.

6. An extendable and retractable leg rest comprising:

a support member for fixing the leg rest to the frame of a wheelchair or the like;

a first elongated member having a first end pivotally connected to the support member;

an actuator coupled to the support member and to the first elongated member, the actuator adapted to rotate the first elongated member relative to the support member about the pivotal connection of the first end;

a first linkage pivotally coupled at a linkage first end to the support member and having a First gear rack at a second linkage end, the first linkage fixed in a position generally parallel to the first member;

a footrest support member slidingly coupled to the first elongated member, the footrest support member including a second gear rack;

a footrest adjustably coupled to the footrest support member; and a first gear component operatively engaged with the first gear rack and the second gear rack, wherein as the actuator rotates the first elongated member and the first linkage, the first linkage moves the first gear rack relative to the second gear rack and the footrest support member, causing the footrest support member and the footrest to translate linearly relative to the first elongated member via the engagement between the first gear rack, the second gear rack and the first gear component.

7. An extendable and retractable leg rest as claimed in claim 6, wherein the gear component comprises at least a first spur gear supported by the first elongated member and operatively engaging the first and second gear racks.

8. The extendable and retractable leg rest of claim 7, wherein the gear component further comprises a second spur gear, and wherein the first spur gear is operatively engaged with the first gear rack and the second spur gear is operatively engaged with the second gear rack, the first and second spur gears being fixedly coupled together for rotation about a common axis, wherein the first spur gear has a first diameter and the second spur gear has a second diameter, smaller than the first diameter, such that linear movement of the second spur gear along the second gear rack results in movement of the first gear rack by the first spur gear by a second amount, larger than the first amount.

9. The extendable and retractable leg rest of claim 6, further comprising a biasing member coupling the first linkage to the first elongated member, and biasing the first linkage into operative engagement with the gear component.

10. The extendable and retractable leg rest of claim 6, wherein the actuator is a linear actuator.

11. An extendable and retractable leg rest for vehicle, comprising:

a support member for releaseably fixing the leg rest to the frame of a vehicle;

a first elongated member having a first end pivotally connected to the support member;

an actuator coupled to the first elongated member and adapted to rotate the first elongated member relative to the support member about the pivotal connection of the first end;

a first linkage pivotally coupled at a linkage first end and having a first gear positioned at a second linkage end;

a footrest support member coupled to the first elongated member and capable of linear relative movement with respect to the first elongated member, the footrest support member including a second gear;

a footrest coupled to the footrest support member; and a first gear connection operatively engaged with the first gear and the second gear such that, as the actuator rotates the first elongated member and the first linkage, the first linkage moves first gear connection relative to the second gear and the footrest support member, causing the footrest support member and the footrest to translate linearly relative to the first elongated member, wherein the first elongated member and first linkage are rotated by the actuator about their pivotable mountings between a lowered position and a raised position and the footrest is translated away from the first elongated member as the first elongated member is moved between the lowered position and the raised position, and the footrest is translated toward the first elongated member as the first elongated member is moved between the raised position and the lowered position.

* * * * *